Aug. 30, 1966  E. J. BARNETT  3,269,016
CONIC TOOL GUIDE
Filed Oct. 22, 1965  2 Sheets-Sheet 1

INVENTOR.
EDWARD J. BARNETT
BY
Kenway, Jenney & Hildreth
ATTORNEYS

INVENTOR.
EDWARD J. BARNETT

United States Patent Office 3,269,016
Patented August 30, 1966

3,269,016
CONIC TOOL GUIDE
Edward J. Barnett, 162 Nason Hill Road, Sherborn, Mass.
Filed Oct. 22, 1965, Ser. No. 501,420
5 Claims. (Cl. 33—27)

The present invention relates to an apparatus for guiding a tool, and more particularly relates to apparatus for guiding a tool along a conic curve.

Apparatus for guiding a tool along a tapered or circular path has long been available. Such devices are easily fabricated from straightforward slide or pivot arrangements. However, with modern machines the function desired to be performed by the resulting structure is often no longer a pure circular path. In the past, non-circular curves have usually been approximated by circular sections. While such approximations may be adequate for many applications, modern requirements are often more critical.

For some devices it has been practical to make a tool shaped to the particular curve desired, such as a parabola, and then use this tool to cut a corresponding conic section from a rotating work piece. Such a tool is expensive to produce and is suitable for turning only a single section of given dimensions.

Accordingly, it is an object of the present invention to provide a machine which will guide a tool along a selected conic curve.

Another object is to provide a machine that will guide a tool along a selected parabolic, hyperbolic, elliptical or circular curve.

Still another object is to provide a curve generating machine which can be fabricated from standard machine tool elements.

A further object is to provide a machine for guiding a tool along a conic path while maintaining the tool at a constant angle with respect to the path.

These and other objects of the invention are achieved with a machine employing a tool post pivoted to a four-bar linkage and free to slide in a sliding member. The four-bar linkage itself is pivoted to the sliding member and its two remaining pivots slide in a rotating guide.

A further feature of the invention is the provision of a pivot and slide arrangement for the tool so that a constant angle between the tool and the work face is maintained.

The invention likewise involves the further features set forth in the following description and drawings wherein.

Figures 1, 2:
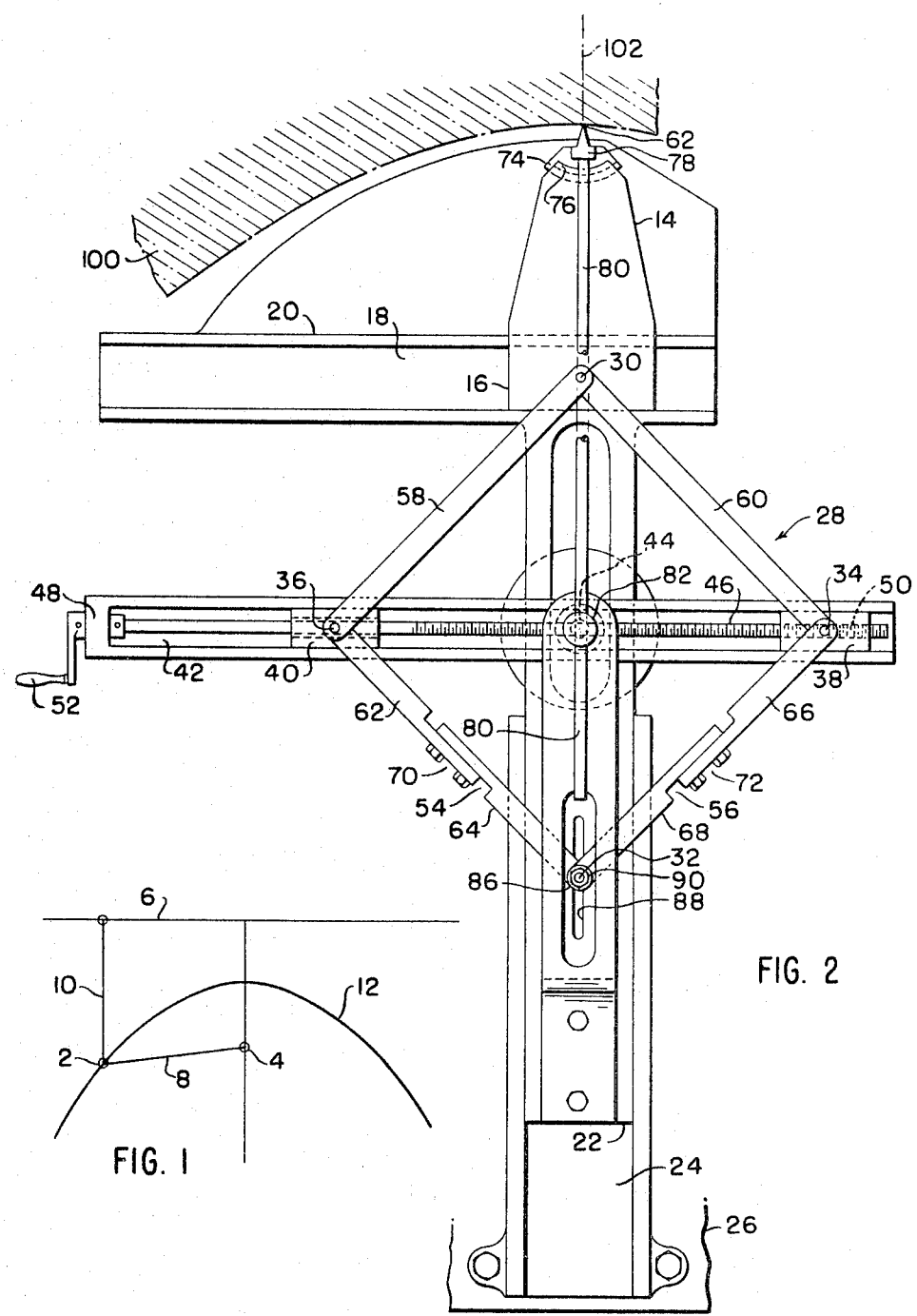
FIG. 1 is a sketch of a conic curve.
FIG. 2 is a plan view of a machine tool according to the present invention.
Figure 3:
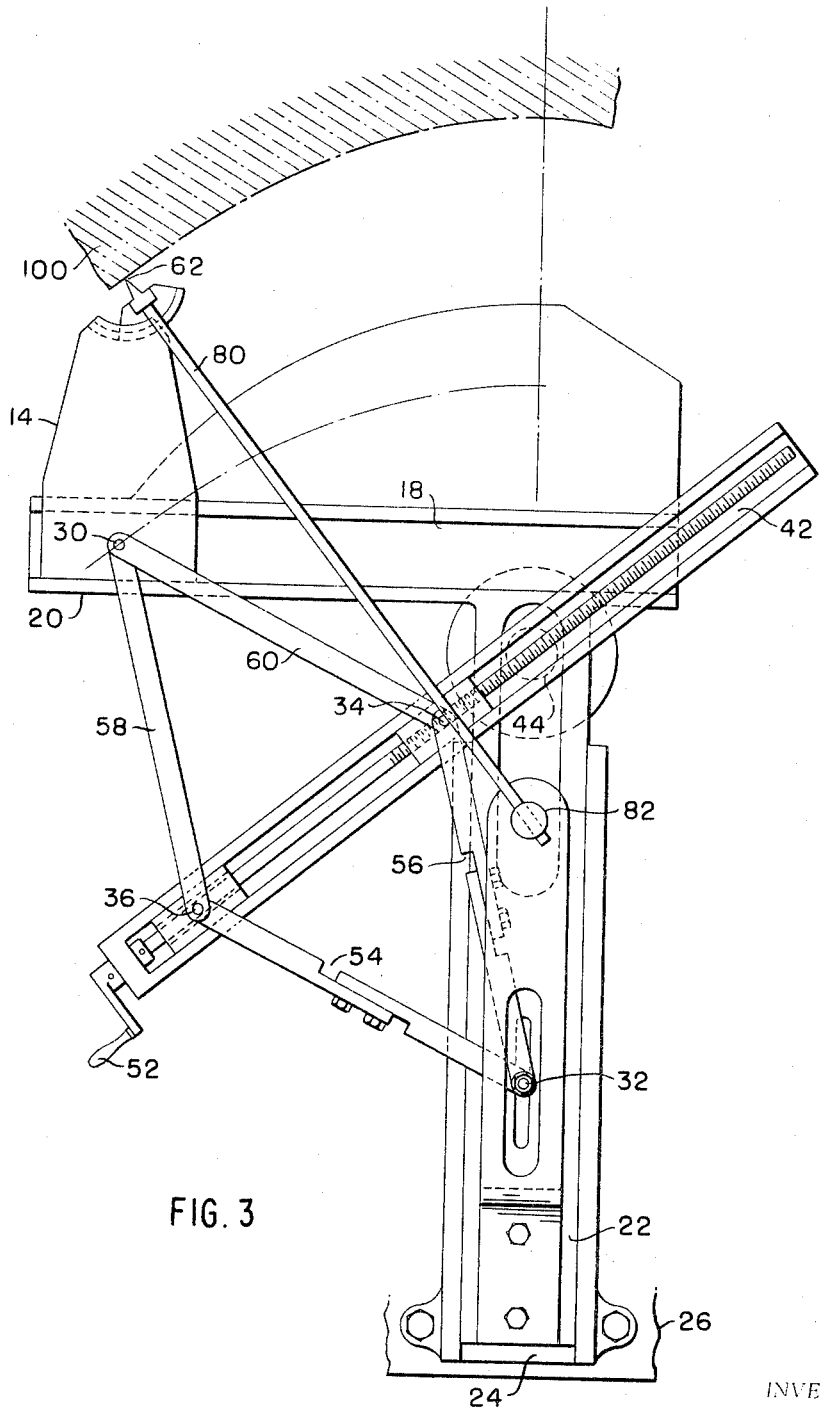
FIG. 3 is a plan view of the machine tool of FIG. 1 after movement of the tool to another position.

Referring now to FIG. 1, a sketch showing the major aspects of a conic path is shown. A conic is the locus of a point, the point 2 in FIG. 1, which moved so that its distance from a fixed point, the focus, bears a constant ratio to its distance from a fixed line, the directrix. At the point 2 shown in FIG. 1 these distances would be the line 8 connecting the point 2 with the focus 4 and the line 10 connecting the point 2 with the directrix 6. The locus of all lines bearing this ratio will fall along the curve 12. The ratio of the distances to the focus and from the directrix is called the eccentricity. If the eccentricity $e$ equals 1 the curve 12 is a parabola. If the eccentricity $e$ is less than 1 the curve 12 is an ellipse. If the eccentricity $e$ is greater than 1 the curve 12 is a hyperbola. The present invention sets forth apparatus which will move a tool along any of these conic paths.

Referring now to FIG. 2, an embodiment of the present invention is set forth in plan view. The tool post 14 has a slide 16 moving in a way 18. The way 18 is formed in a sliding member 20 which has a slide 22 free to move in way 24. The way 24 is fixed to the base 26 for the machine. The slide 22 is thus free to move in way 24 in a direction perpendicular to the way 18 formed in sliding member 20.

A four-bar linkage 28 has one of its four pivot points on tool post 14. This pivot point 30 is centered on slide 16 of tool post 14. The opposite pivot 32 is secured to way 22 of the sliding member 20. The other two pivots 34 and 36 are fastened to slides 38 and 40. These slides move in way 42. Way 42 forms a rotating guide pivoted about pivot 44. Pivot 44 is in line with way 24 and fixed to base 26. A screw 46 held in a bearing 48 in one end of way 42 passes through slide 40 and engages threads 50 in slide 38. Rotating handle 52 on screw 46 will thus vary the shape of the four-bar linkage 28.

If the four bars 54, 56, 58 and 60 are equal in length, the pivot point 30 will trace a parabolic curve as handle 52 is rotated. The focal length of this curve is the distance between the pivot 44 for the rotating guide 42 and pivot 30 of the four-bar linkage. Links 54 and 56 are each composed of two sections, that is, sections 62 and 64 and sections 66 and 68 respectively. These sections may be adjusted and fixed into a new position by clamps 70 and 72 respectively. If arms 54 and 56 are adjusted to be equal to each other but longer than arms 58 and 60, the apparatus will generate an hyperbola. If the links 54 and 56 are adjusted to be shorter than links 58 and 60, then the tool will generate an ellipse.

The conic path is traced by the pivot point 30. The tool itself is offset at point 62 on tool post 14. If the tool 62 is fixed firmly to tool post 14, the angle between the tool and the work piece will vary along the curve. This can result in inefficient cutting angle and errors in the curve being traced. Therefore it is desirable to maintain a constant angle between the tool 62 and the work being cut. In the present invention this angle is maintained by pivoting the tool 62 in a rotary slide 74 in a circular way 76 cut into tool post 14. This circular slide has the effect of creating a pivot point at the tip of the tool 62. The tool holder 78 has an extended arm 80 which slides through a pivot 82. The pivot 82 is fixed to the sliding member 20. The distance between pivot 82 and pivot 32 of the four-bar linkage is equal to the distance between the tool point 62 and pivot 30 of the four bar linkage.

To vary the focal length of the conic section being generated the pivot 32 moves on a slide 86 in way 88 of sliding member 20. Set screw 90 fixes the pivot 32 in the selected position.

If it is desired to generate a circular path, the way 24 may be released with respect to base 26 so that the apparatus rotates about pivot 44. In that case the linkage points will remain fixed, except for adjustment to change the position of pivot 30 with respect to pivot 44 and thus change the radius of the circle.

While the invention has been described in terms of moving the tool point 62 along a predetermined plane path, if the work piece 100 is rotated about an axis 102 in line with way 24, as in a machine lathe, a solid conical section will be turned. Depending on the adjustments made to the apparatus the conical section will be that of a parabola, an ellipse or an hyperbola.

The apparatus of the present invention is also suitable for use directly in two dimensions. In that case the tool point 62 may describe a desired curve, or a cutting tool may be held to cut desired portions from flat stock. Similarly, welding, torch cutting, etching or other operations may be made along predetermined paths if the appropriate equipment is affixed at point 62.

The particular embodiments discussed above are illustrative and do not serve as limitations. Those skilled in the mechanical arts will recognize that other configurations may be used to form apparatus according to my invention. In each case the structure will employ a four-bar linkage manipulated to generate the desired locus.

Having thus described my invention, I claim:

1. Apparatus for moving a tool along a selected conic path comprising a sliding member having a first slide free to move in a first way, a second way on said sliding member located perpendicular to said first way, a tool post having a second slide free to move in said second way, a four-bar linkage, a first pivot of said four-bar linkage affixed to said tool post, a second pivot of said four-bar linkage affixed to said sliding member, third and fourth pivots of said four-bar linkage affixed to third and fourth slides, and a rotating guide having a third way, said third and fourth slides moving in said third way, said third way having a fifth pivot in line with said first way, and means to vary the separation of said third and fourth slides, whereby said tool post moves through a conic path.

2. Apparatus for moving a tool along a selected conic path comprising a sliding member having a first slide free to move in a first way, a second way on said sliding member located perpendicular to said first way, a tool post having a second slide free to move in said second way, a circular way on said tool post, a tool holder, a slide on said tool holder located in said circular way, a pivot member on said sliding member, an extended portion of said tool holder passing through said pivot member, a four-bar linkage, a first pivot of said four-bar linkage affixed to said tool post, a second pivot of said four-bar linkage affixed to said sliding member, third and fourth pivots of said four-bar linkage affixed to third and fourth slides, and a rotating guide having a third way, said third and fourth slides moving in said third way, said third way having a fifth pivot in line with said first way, and means to vary the separation of said third and fourth slides, whereby said tool post moves through a conic path with said tool holder maintaining a constant angle with respect to a work piece.

3. Apparatus for moving a tool along a selected conic path comprising a sliding member having a first slide free to move in a first way, a second way on said sliding member located perpendicular to said first way, a tool post having a second slide free to move in said second way, a four-bar linkage, a first pivot of said four-bar linkage affixed to said tool post, a second pivot of said four-bar linkage affixed to said sliding member, third and fourth pivots of said four-bar linkage affixed to third and fourth slides, and a rotating guide having a third way, said third and fourth slides moving in said third way, said third way having a fifth pivot in line with said first way, means to vary the position of said second pivot to vary the focal length of said conic path, and means to vary the separation of said third and fourth slides, whereby said tool post moves through a conic path.

4. Apparatus for moving a tool along a selected conic path comprising a sliding member having a first slide free to move in a first way, a second way on said sliding member located perpendicular to said first way, a tool post having a second slide free to move in said second way, a four-bar linkage, a first pivot of said four-bar linkage affixed to said tool post, first and second arms of said four-bar linkage connected to said first pivot, said first and second arms being of equal length, a second pivot of said four-bar linkage affixed to said sliding member, third and fourth arms of said four-bar linkage connected to said second pivot, said third and fourth arms being of equal length, third and fourth pivots of said four-bar linkage affixed to third and fourth slides, and a rotating guide having a third way, said third and fourth slides moving in said third way, said third way having a fifth pivot in line with said first way, means to vary the length of said third and fourth arms with respect to said first and second arms to change the eccentricity of the conic path, and means to vary the separation of said third and fourth slides, whereby said tool post moves through a conic path.

5. Apparatus for moving a tool along a selected conic path comprising a base, a sliding member having a first slide free to move in a first way, a second way on said sliding member located perpendicular to said first way, a tool post having a second slide free to move in a said second way, a four-bar linkage, a first pivot of said four-bar linkage affixed to said tool post, a second pivot of said four-bar linkage affixed to said sliding member, third and fourth pivots of said four-bar linkage affixed to third and fourth slides, and a rotating guide having a third way, said third and fourth slides moving in said third way, said third way having a fifth pivot affixed to the base in line with said first way, and means to release the first way with respect to the base, whereby said tool post moves through a conic path which is circular in nature.

No references cited.

LEONARD FORMAN, *Primary Examiner.*